United States Patent
Pearce

[11] 3,768,654
[45] Oct. 30, 1973

[54] FILTERS
[75] Inventor: Francis Preston Pearce, Amersham, England
[73] Assignee: Airpel Limited, Chalfont St. Perer, England
[22] Filed: May 1, 1972
[21] Appl. No.: 249,434

Related U.S. Application Data
[63] Continuation of Ser. No. 12,827, Feb. 19, 1970, abandoned.

[30] Foreign Application Priority Data
Feb. 21, 1969 Great Britain ..................... 9,516/69

[52] U.S. Cl. ................. 210/232, 210/340, 210/452, 210/455, 210/477
[51] Int. Cl. ........................................... B01d 35/02
[58] Field of Search ................... 210/340, 341, 343, 210/232, 234, 235, 248, 452, 451, 455, 477, 339

[56] References Cited
UNITED STATES PATENTS
2,921,687 1/1960 Jenkins ........................... 210/452 X
1,774,758 9/1930 Morse et al ..................... 210/340 X
2,352,269 6/1944 Kraissl, Jr. ........................... 210/452
1,759,927 5/1930 Zwicky ........................... 210/340 X
1,708,711 4/1929 Vincent ........................... 210/340 X
1,068,743 7/1913 Dahl ................................. 210/341 X Primary Examiner—Samih N. Zaharna
Assistant Examiner—F. F. Calvetti
Attorney—Laurence R. Brown

[57] ABSTRACT

A pipeline filter unit comprising a filter basket closed at one and disposed coaxially, and in use vertically with its open end up, within a chamber having inlet and outlet connections providing for downflow of liquid to be filtered through the basket from its open end and a top cover removable to permit withdrawal of the basket. The element is arranged to seat against a supporting flange within the filter chamber; the inlet compartment on the side of the open end of the element is formed with a gallery all around the element-supporting flange; and the gallery is fitted with a drain. The invention also extends to a four-way changeover cock having a control diverter integral with its body and two ported members secured to a spindle for rotation within the body.

5 Claims, 3 Drawing Figures

PATENTED OCT 30 1973 3,768,654

INVENTOR
Francis P. Pearce
BY
Watson, Cole, Grindle & Watson
ATTORNEYS

FILTERS

This a continuation, of application Ser. No. 12,827 filed Feb. 19, 1970, now abandoned.

The invention relates to filters for insertion into pipelines. Typical units use perforated metal sheet or woven wire meash as the filtering medium, the sheet or mesh being made in the form of an element commonly called "the filter basket", which is removable for cleaning purposes.

The filter baskets of pipeline filters are usually cylindrical in form and closed at one and in use they are disposed vertically coaxially within a cylindrical chamber having inlet and outlet connections providing for flow of fluid to be filtered through the basket from its open end. The chamber will normally have a top cover removable to permit withdrawal of the basket and a drain cock located at or near the lowest part of the base.

In units where the filtering requirements are sufficiently uncritical to make it unnecessary to form a perfect seal around the open end of the filter basket it is convenient and the common practice, to dispose the element with its open end downwards the circumference fitting closely within an internal flange around the chamber wall, the space below which serves as an inlet compartment for dirty fluid and is fitted with a drain plug as mentioned above. The basket will often be secured by a central spindle which also serves as cover-securing stud.

On the other hand a requirement that the filter element shall be completely sealed against passage off fluid around its open end effectively dictates the arrangement of the element with its open end up so that its open rim may be flanged and fitted with a sealing ring to seat on a supporting flange in the filter chamber. Usually the basket will be urged against its seat by the top cover of the chamber bearing on an arched member which also serves as a handle for the basket The space above the element and between its upper flange and the inside of the chamber cover now forms the inlet chamber, and is normally filled with unfiltered fluid which is only separated from the clean or filtered fluid by the element basket.

The downflow configuration has one serious disadvantage relative to the upflow which is that dirty fluid will always contaminate clean fluid on the outlet side when the filter element is removed for cleaning. The invention can be used to provide a simple and effective solution to that problem and can usefully be applied to the design of both single and double filter units incorporating effective safeguards against errors of procedure during cleaning and maintenance.

The element of a filter in accordance with the invention is arranged to seat against a supporting flange within a filter chamber and the compartment on the side of the open end of the element, the inlet compartment, is formed with a gallery all around the element supporting flange. The gallery is fitted with a drain. Provided that the gallery is drained before the cover is removed from the filter chamber to permit withdrawal of the element the risk of accidental contamination in the lower outlet compartment is avoided and at the same time the operator is assured that the filter chamber is depressurised before the cover is loosened.

To ensure that the cover and element are not removed without draining the gallery of a filter in accordance with the invention it is preferable to arrange for the gallery drain to be closed by a plug formed on the end of a coverretaining member, typically a bolt, or otherwise to arrange that the drain must be opened before the cover can be released.

A still greater degree of safety can be imparted to a filter in accordance with the invention if the cover is so arranged that the retaining member associated with the gallery drain must be released before any other step is taken to loosen the cover.

In the case of a double unit it is possible to ensure that neither chamber is opened unless fluid flow to it is shut off, nor fluid admitted to either chamber unless it has been properly closed, by means of a shroud associated with the spindle of the cock and arranged to obstruct access to the gallery drain plug and retaining member of a chamber which is in use and to engage either such member unless it is fully secured to close the chamber.

Another aspect of the invention is concerned with the design of the valve by which flow of fluid is controlled between the two chambers of a double unit to enable filters to be cleaned and/or replaced without interruption of fluid flow.

A four-way changeover cock in accordance with the invention has a central diverter integral with the body and comprises two ported members secured to a common spindle for rotation thereby within the body. A cock in accordance with the invention advantageously incorporates a pressure balancing device consisting of suitably dimensioned and positioned depressions on the outer sealing surfaces of the rotating members vented to a zone of relatively low pressure.

In order that the invention may be better understood a dual filter unit in accordance with it will be described by way of example with reference to the accompanying informal drawing in which.

Figure 1:
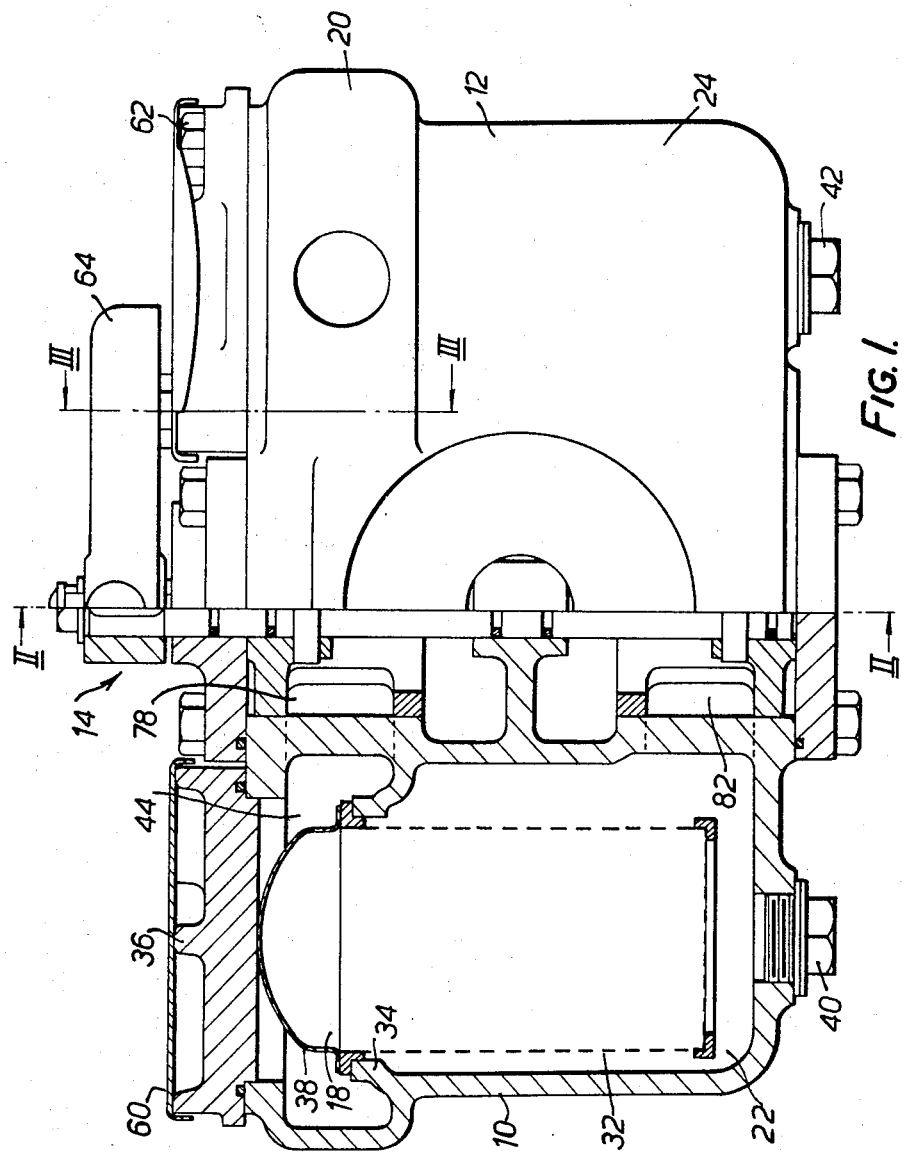
FIG. 1 is an elevation from the inlet side, partly in section on the line I — I of FIG. 2.

The general layout of the filter, suitable for the straining or filtering of such liguids as fuel oil, is similar to those in current use, according to which two filter chambers 10, 12 are arranged on either side of a manual rotary changeover cock 14 by which liquid entering the unit at the inlet 16 may be directed to the upper compartment 18, 20 of either or both of the chambers 10, 12 and passed from the lower compartments 22, 24 of the filter chamber to the output 26 by rotation of a central spindle 28 through a handle 30.

Within each filter chamber there is a strainer or filter element (basket) 32, open at its upper end which is flanged and urged into sealing engagement with a flange 34 by pressure of the top cover 36 of the filter compartment on the arched handle member 38 of the basket. To pass from inlet to outlet liquid must enter an element 32 from above through its open end and pass through its mesh or openings in the lower compartment of the chamber. Each of the lower chambers has a drain plug 40, 42 provided, but being on the clean fluid side are unlikely to be put to any out exceptional use.

Figure 3:
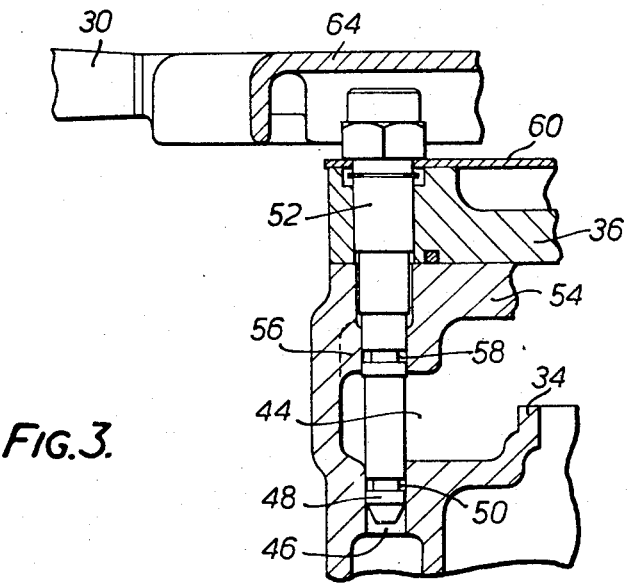
FIG. 3 is a partial section on the line III — III of FIG. 1, showing the gallery drain plug arrangement.

The flange 34 in each filter compartment is shaped to form a substantial gallery or annular channel 44 around the open end of the element 32 and adjacent the inlet port to the chamber (FIG. 3) each gallery has a drain 46, normally closed by a plug 48 carrying an 'O' ring seal 50.

The drain plug 48 is formed on the end of a bolt 52, one of four securing the top cover 36, which passes through the top flange 54 of the filter chamber, the latter being thickened at 56 to accommodate an 'O' ring seal 58 on the reduced shank of the bolt.

By this arrangement it is made impossible to remove the top cover 36 without first de-pressurising the chamber by withdrawal of the plug 48 as the bolt 52 is slackened. Dirty liquid will then drain from the gallery so that the filter basket can be removed without thereby contaminating already filtered liquid in the base of the chamber. The drain necessarily being open until the basket and cover are replaced any leakage of dirty liquid past the cock 14 will drain away without risk of contamination of clean liquid.

additional precautions against premature release of the top cover on admission of liquid to the chamber are as follows:

The bolts 52 passes through a safety plate 60 which is captive with the bolt; the other three bolts, one of which appears at 62 in FIG. 1, all lie below this plate and cannot therefore be touched until the bolt 52 and plate have been removed.

On the handle 30 there is a semi-circular shroud 64, arranged so that it will cover the head of the bolt 52 so long as the cock 14 is set to admit liquid to the filter chamber, and flanged to prevent access from the side.

The safety plates 62 are flanged around the edges of the top covers so that they cannot be swung aside and must be in correct position before the bolt 52 can be screwed home to close the drain 46 and clear the shroud 64.

There is a locking plunger 66 on the handle 30 to prevent accieental or careless movement of the handle while either chamber is open.

The arrangement of gallery, drain and combined plug and cover securing bolt, with safety plate is equally applicable to a single chamber filter unit.

The cock 14 comprises a body 68, integrally cast with the bodies of the filter chambers 10 and 12, and divided by an integral centre diverter 70. The spindle 28 passes through the diverter 70 with '0' ring seals at 72 and 74. within the upper part of the body 68 the spindle carries a ported member 76 to control flow of liquid from the inlet 16 through an inlet port 78 to the upper compartment of one of the filter chambers and within the lower port or similar member 80 cntrols flow to the outlet 26 from an outlet port 82 at the base of each filter chamber. The ends of the body 68 are closed by upper and lower covers 84 and 86.

The inlet and outlet ports 78,82 of the chamber 10 lie at 45° to the axes of the inlet and outlet 16 and 26 of the unit and the ports of the chamber 12 are similarly disposed on the other side of the through flow axis.

Figure 2:
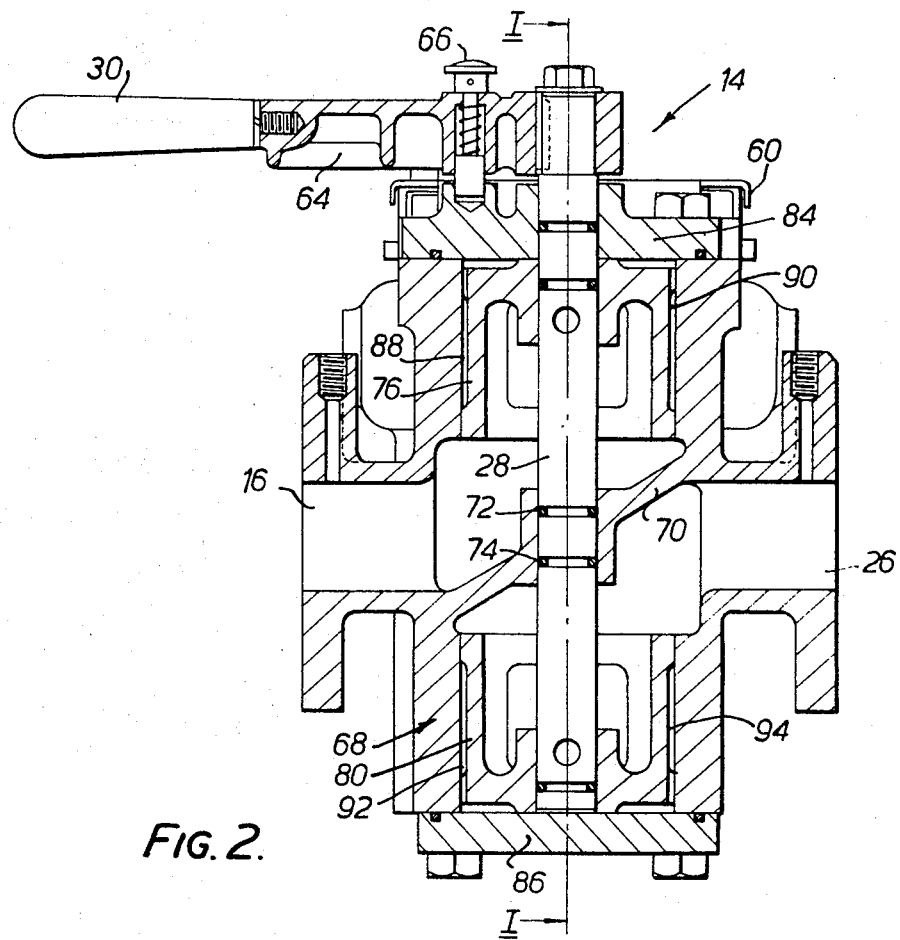
FIG. 2 is a section on the line II — II of FIG. 1.

With the handle in the position shown there is communication with both chambers. When one chamber only is in use and the other is open pressure within the valve body 68 will urge the members 76 and 80 strongly towards the closed ports and may make it difficult to operate the valve when line pressure is high. To reduce this unbalance the members 76 and 80 are formed with diametrically opposed areas on either side of their ports as shown at 88, 90, 92, 94 in FIG. 2 and these openings, somewhat smaller than the ports to retain some unbalance pressure, communicate around the outer ends of the member with the disconnected chamber when either chamber is cut off. The amount of residual unbalance can be selected by choice of area of the depressions in relation to the ports so that the ports may be effectively sealed when closed without undue resistance to rotation when it is required to put a chamber which has been opened back into service.

I claim:

1. A pipe line filter unit comprising a filter basket element closed at one end and disposed coaxially, and inuse vertically with its open end up, within a filter chamber having inlet and outlet connections providing for down flow of input liquid to be filtered through the basket from its open end to said outlet connection and a top cover removable to permit withdrawal of the basket; the element having seating structrue mating against a supporting flange within the filter chamber; an inlet compartment receiving said inlet connection on the side of the open end of the elment formed with a gallery all around the element-supporting flange; and the gallery having a removable drain plug disposed to release unfiltered liquid from said chamber and filtered liquid from said gallery before removing the filter.

2. A filter unit according to claim 1, in which the gallery drain plug is formed on a cover-retaining bolt.

3. A filter unit according to claim 2, including cover fastening means arranged so that the retaining bolt associated with the gallery drain must be released to loosen the cover.

4. A filter unit according to claim 3, in which the fastening means comprises a plate captive with said gallery drain bolt and a plurality of cover retaining bolts lying below this plate.

5. A filter unit according to claim 4, having two similar side by side filter chambers with a cock valve movable by a spindle therebetween directiong said inlet and outlet connections into a selected one of the two chambers in which a shroud is affixed to the spindle of the cock by which flow of fluid is controlled between the two chambers of the unit, the said shroud being arranged to obstruct access to the gallery drain bolt and plate retaining member of a chamber which is in use.

* * * * *